United States Patent
Natarahjan et al.

(10) Patent No.: US 9,924,451 B2
(45) Date of Patent: Mar. 20, 2018

(54) SYSTEMS AND METHODS FOR COMMUNICATING HALF-RATE ENCODED VOICE FRAMES

(71) Applicant: MOTOROLA SOLUTIONS, INC., Schaumburg, IL (US)

(72) Inventors: Harish Natarahjan, Streamwood, IL (US); Mohd Syazani b Abdul Aziz, Coral Springs, FL (US); Andor Almasi, Cooper City, FL (US); Jesus F. Corretjer, Weston, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 154 days.

(21) Appl. No.: 14/957,336

(22) Filed: Dec. 2, 2015

(65) Prior Publication Data
US 2017/0164271 A1 Jun. 8, 2017

(51) Int. Cl.
*H04L 1/00* (2006.01)
*H04W 48/16* (2009.01)

(52) U.S. Cl.
CPC .......... *H04W 48/16* (2013.01); *H04L 1/0041* (2013.01)

(58) Field of Classification Search
CPC .................................................. H04W 48/16
See application file for complete search history.

(56) References Cited

U.S. PATENT DOCUMENTS

| | | | | |
|---|---|---|---|---|
| 5,058,159 A * | 10/1991 | Quan | ..................... | H04N 7/167 348/E7.055 |
| 5,862,260 A * | 1/1999 | Rhoads | ............. | G06F 17/30876 382/232 |
| 5,970,058 A * | 10/1999 | DeClerk | ........... | H04W 36/0094 370/329 |
| 6,122,403 A * | 9/2000 | Rhoads | ............. | G06F 17/30876 382/233 |
| 6,301,663 B1 * | 10/2001 | Kato | ..................... | G06T 1/0021 380/201 |
| 6,765,931 B1 * | 7/2004 | Rabenko | .................. | H04B 3/23 348/E7.049 |
| 6,850,619 B1 * | 2/2005 | Hirai | ..................... | H04N 5/913 380/201 |

(Continued)

*Primary Examiner* — Parth Patel
(74) *Attorney, Agent, or Firm* — Michael Best & Friedrich LLP

(57) ABSTRACT

A method for communicating half-rate encoded voice frames. The method includes receiving, by a digital signal processor, a half-rate encoded voice frame. The method further includes determining, by the digital signal processor, a network access code. The method further includes encoding, by the digital signal processor, a network identifier based on the network access code. The method further includes scrambling, by the digital signal processor, the network identifier to generate a scrambled network identifier. The method further includes generating, by the digital signal processor, an erasure pattern. The method further includes generating, by the digital signal processor, a half-rate embedded voice code word based on the erasure pattern and the half-rate encoded voice frame. The method further includes generating, by the digital signal processor, a half-rate embedded logical data unit based on the half-rate embedded voice code word and the scrambled network identifier.

16 Claims, 8 Drawing Sheets

(56) References Cited

U.S. PATENT DOCUMENTS

| | | | | |
|---|---|---|---|---|
| 7,738,487 B2* | 6/2010 | El-Maleh | H04L 1/0046 | 370/252 |
| 8,102,872 B2* | 1/2012 | Spindola | G10L 19/012 | 370/450 |
| 9,269,362 B2* | 2/2016 | Kakkirala | G10L 19/018 | |
| 9,363,482 B2* | 6/2016 | Hunacek | H04N 7/1675 | |
| 2003/0040326 A1* | 2/2003 | Levy | H04K 1/02 | 455/466 |
| 2006/0133388 A1* | 6/2006 | Wang | H04L 27/261 | 370/400 |
| 2007/0143576 A1* | 6/2007 | Ellgen | H04N 5/268 | 712/10 |
| 2007/0245386 A1* | 10/2007 | Morley | G11B 20/00007 | 725/78 |
| 2008/0134000 A1* | 6/2008 | Wiatrowski | H04L 1/0041 | 714/758 |
| 2010/0191525 A1* | 7/2010 | Rabenko | H04B 3/23 | 704/211 |
| 2010/0234071 A1* | 9/2010 | Shabtay | H04B 7/0408 | 455/562.1 |
| 2011/0038302 A1* | 2/2011 | Papasakellariou | H04L 5/0007 | 370/315 |
| 2011/0170480 A1* | 7/2011 | Pi | H04W 48/12 | 370/328 |
| 2011/0255483 A1* | 10/2011 | Xu | H04L 25/0232 | 370/329 |
| 2012/0008724 A1* | 1/2012 | Darr | H03H 17/0422 | 375/359 |
| 2012/0011592 A1* | 1/2012 | Loytynoja | G06F 21/10 | 726/26 |
| 2012/0078797 A1* | 3/2012 | Szucs | G06F 21/10 | 705/57 |
| 2012/0171963 A1* | 7/2012 | Tsfaty | H04B 11/00 | 455/41.3 |
| 2012/0214545 A1* | 8/2012 | Johnson | G08B 21/24 | 455/556.1 |
| 2013/0152121 A1* | 6/2013 | Bartel-Kurz | H04H 60/15 | 725/31 |
| 2014/0006017 A1* | 1/2014 | Sen | G10L 21/003 | 704/208 |
| 2014/0040623 A1* | 2/2014 | Conus | H04N 21/222 | 713/176 |
| 2014/0185862 A1* | 7/2014 | Kamath | G06Q 20/3829 | 382/100 |
| 2015/0194159 A1* | 7/2015 | Mai | G10L 21/00 | 381/119 |
| 2015/0256679 A1* | 9/2015 | Burnett | H04M 3/533 | 379/88.12 |
| 2016/0182973 A1* | 6/2016 | Winograd | G06F 17/3079 | 725/25 |
| 2016/0218790 A1* | 7/2016 | Hwang | H04B 17/24 | |
| 2017/0099688 A1* | 4/2017 | Chae | H04W 76/023 | |

* cited by examiner

SYSTEMS AND METHODS FOR COMMUNICATING HALF-RATE ENCODED VOICE FRAMES

BACKGROUND OF THE INVENTION

Some communications networks, for example, Land mobile radio (LMR) networks operating according to the Association of Public Safety Communications Officials (APCO) "Project 25" (P25) standards, use both time division multiple access (TDMA) and frequency division multiple access (FDMA) protocols. Generally, time division multiple access protocols utilize half-rate encoded voice frames, and frequency division multiple access protocols utilize full-rate encoded voice frames. Full-rate encoded voice frames take up to twice as much radiofrequency bandwidth as the half-rate encoded voice frames.

Digital vehicular repeater systems, which are often configured to use a frequency division multiple access protocol, are sometimes used to extend fixed land mobile radio networks that are configured to use a time division multiple access protocol. To communicate with a digital vehicular repeater, a two-way radio would have to use the frequency division multiple access protocol. Because that protocol requires full-rate encoded audio, the two-way radio is unable to communicate with the portion of the land mobile radio network that uses half-rate encoded audio and a time division multiple access protocol.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
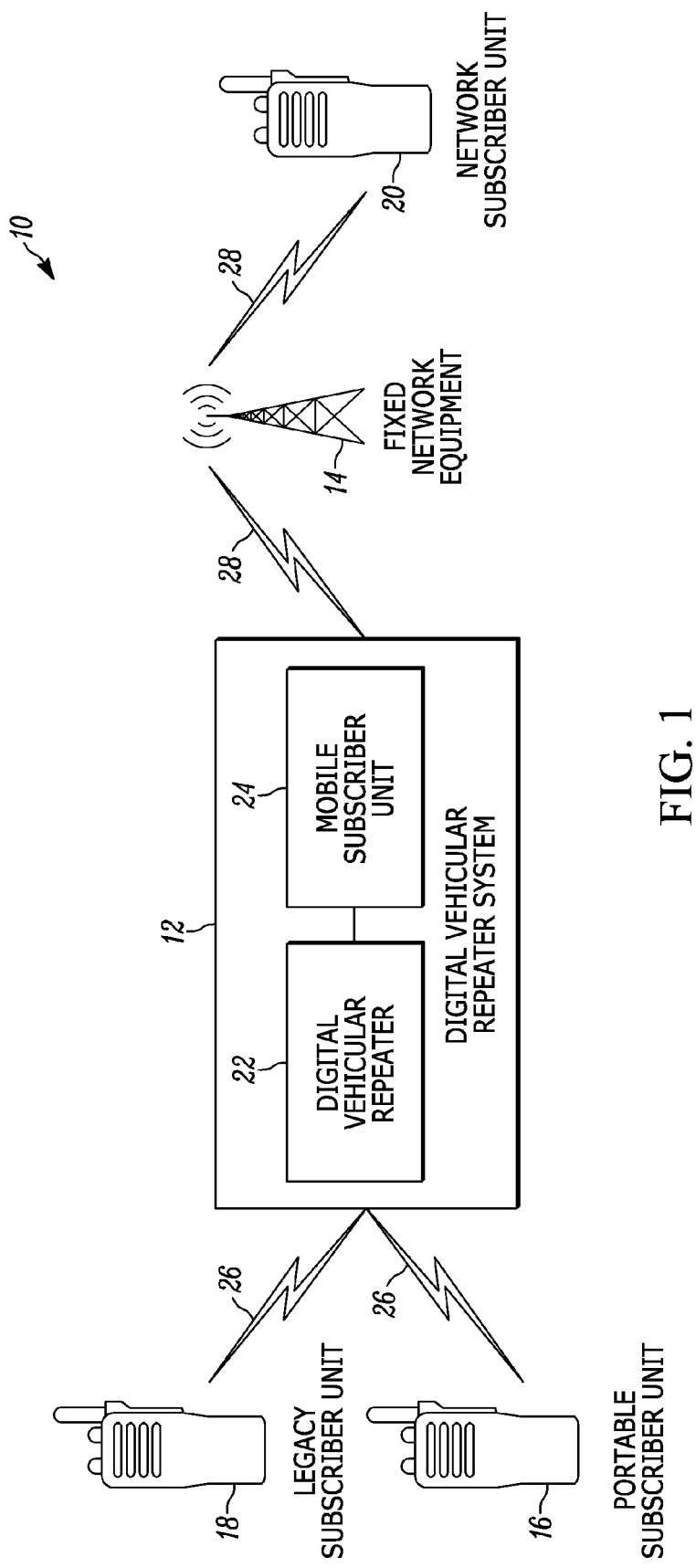
FIG. 1 is a block diagram of a communications system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One exemplary embodiment provides a method for communicating half-rate encoded voice frames. The method includes receiving, by a digital signal processor, a half-rate encoded voice frame. The method further includes determining, by the digital signal processor, a network access code. The method further includes encoding, by the digital signal processor, a network identifier based on the network access code. The method further includes scrambling, by the digital signal processor, the network identifier to generate a scrambled network identifier. The method further includes generating, by the digital signal processor, an erasure pattern. The method further includes generating, by the digital signal processor, a half-rate embedded voice code word based on the erasure pattern and the half-rate encoded voice frame. The method further includes generating, by the digital signal processor, a half-rate embedded logical data unit based on the half-rate embedded voice code word and the scrambled network identifier.

It should be noted that the terms "Project 25 common air interface," the "common air interface," and the "common air interface standard," as used herein, refer to the ANSI/TIA Standard 102.BAAA-A, as approved by the Telecommunications Industry Association on Sep. 17, 2003.

It should also be noted that the term "digital signal processor" may refer to single digital signal processor, or to one or more different types of electronic processing devices, as described herein. Accordingly, as can be appreciated by one skilled in the art, the systems and methods described herein are not limited in their application to a digital signal processor, and they may be implemented using various digital and analog components, which for brevity are not described herein and which may be implemented in hardware, software, or a combination of both.

FIG. 1 is a block diagram of one exemplary embodiment of a communications system 10 for providing wireless communication. In the illustrated embodiment, the communications system 10 is a public safety land mobile radio (LMR) network and may be, for example, implemented in accordance with the Association of Public Safety Communications Officials (APCO) "Project 25" (P25) two-way radio communications protocol. In alternative embodiments, the communications system 10 may operate using other two-way radio communications protocols and standards. The communications system 10 includes a digital vehicular repeater system 12, fixed network equipment 14, a portable subscriber unit 16, a legacy subscriber unit 18, and a network subscriber unit 20. For ease of description, the communications system 10 illustrated in FIG. 1 includes a single digital vehicular repeater system 12, fixed network equipment 14, portable subscriber unit 16, legacy subscriber unit 18, and network subscriber unit 20. Alternative embodiments may include more or fewer of each of these components, may combine some components, or may include other alternative components.

The digital vehicular repeater system 12 includes a digital vehicular repeater 22 and a mobile subscriber unit 24. The digital vehicular repeater system 12 and its components are described more particularly below. The portable subscriber unit 16, legacy subscriber unit 18, and the digital vehicular repeater 22 are communicatively coupled to each other via first radio frequency links 26 using the "Project 25" frequency division multiple access (FDMA) common air interface (CAI).

The fixed network equipment 14 is part of a land-mobile radio network (not shown) or other network such as a cellular telephone network, and may be, for example, a base station including antennas, transmitters, receivers, controllers, and other equipment configured to provide wireless communications to mobile and portable two-way radios. The fixed network equipment 14, network subscriber unit 20, and the mobile subscriber unit 24 are communicatively coupled to each other via second radio frequency links 28 using the "Project 25" Phase 2 time division multiple access (TDMA) protocol, according to the Telecommunications Industry Association standard TIA-102.BBAC. The fixed network equipment 14 is capable of providing wireless communications over a particular coverage area (that is, within a limited distance from the equipment). In some embodiments, the digital vehicular repeater system 12 is mounted in a vehicle such as, for example, a police command vehicle. Accordingly, the digital vehicular repeater system 12 can be positioned to extend the coverage area of the fixed network equipment 14 to allow the portable subscriber unit 16 to communicate with the network subscriber unit 20 (as well as other communications devices).

In the illustrated embodiment, the portable subscriber unit 16, legacy subscriber unit 18, and network subscriber unit 20 are portable two-way radios, for example, the Motorola® ASTRO® 25 family of radios. In alternative embodiments, the portable subscriber unit 16, legacy subscriber unit 18, and network subscriber unit 20 may be mobile two-way radios, cellular telephones, smart telephones, or other electronic communications devices that include, or are capable of being coupled to, a network modem or components to enable wireless network communications (such as an amplifier, antenna, and the like) to the digital vehicular repeater system 12, the fixed network equipment 14, or both. The legacy subscriber unit 18 is configured to implement the existing "Project 25" frequency division multiple access common air interface. As explained in detail below, embodiments of the portable subscriber unit 16 are configured to implement a modified common air interface, which allows wireless communications, using half-rate encoded audio, between the portable subscriber unit 16 and the network subscriber unit 20.

Figure 2:
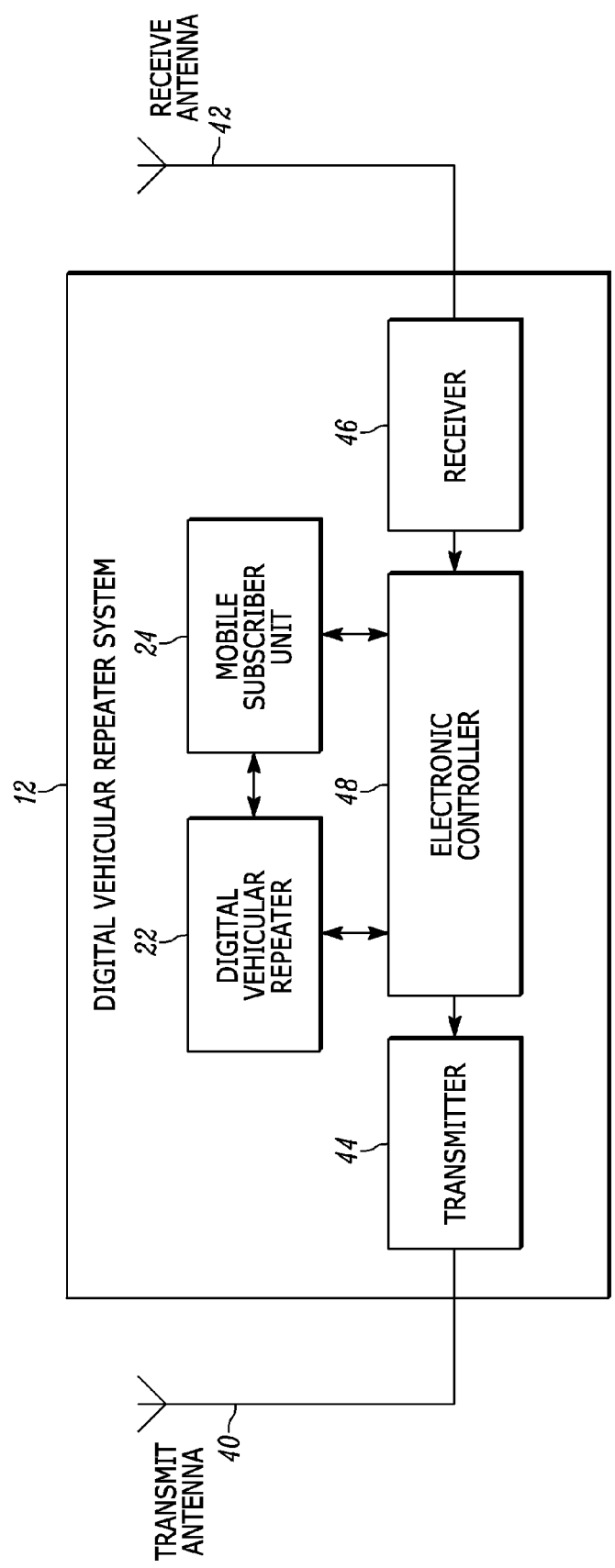
FIG. 2 is a block diagram of a digital vehicular repeater in accordance with some embodiments.

FIG. 2 is a block diagram of one embodiment of the digital vehicular repeater system 12. The digital vehicular repeater system 12 is an electronic communications device including a digital vehicular repeater 22, a mobile subscriber unit 24, a transmit antenna 40, a receive antenna 42, a transmitter 44, a receiver 46, and an electronic controller 48, which along with other various modules and components, are coupled to each other by or through one or more control or data buses that enable communication therebetween. For ease of description, the digital vehicular repeater system 12 illustrated in FIG. 2 includes a single digital vehicular repeater 22, mobile subscriber unit 24, transmit antenna 40, receive antenna 42, transmitter 44, receiver 46, and electronic controller 48. Alternative embodiments may include more or fewer of each of these components, may combine some components, or may include other alternative components. Some embodiments include components that perform multiple functions, for example, a transceiver and a transceiving antenna, instead of separate transmitting and receiving components.

The digital vehicular repeater 22 is configured for radiofrequency communication with the portable subscriber unit 16 and the legacy subscriber unit 18 using the "Project 25" frequency division multiple access common air interface. The digital vehicular repeater 22 is configured for either half-duplex (that is, it can only transmit or receive) or full-duplex (that is, it can simultaneously transmit and receive) radiofrequency communication. The digital vehicular repeater 22 is configured to receive wireless communications from, for example, the portable subscriber unit 16, and transmit those wireless communications to, for example, the legacy subscriber unit 18, and other two-way radios affiliated with the digital vehicular repeater 22. The digital vehicular repeater 22 is configured to communicate with the mobile subscriber unit 24 by sending and receiving time division multiple access frames over a data link via, for example, a cable or other wired connection. In alternative embodiments, the digital vehicular repeater 22 is wirelessly coupled to the mobile subscriber unit 24.

The mobile subscriber unit 24 is a mobile two-way radio, for example, one of the Motorola® APX™ or XTL™ series of mobile two-way radios. The mobile subscriber unit 24 is capable of radiofrequency communication with the fixed network equipment 14 using the "Project 25" time division multiple access protocol. The mobile subscriber unit 24 is configured to receive time division multiple access frames from the digital vehicular repeater 22 and transmit those frames wirelessly, in accordance with the "Project 25" phase 2 protocol, to the fixed network equipment 14. The mobile subscriber unit 24 is further configured to wirelessly transmit and receive time division multiple access frames to and from the fixed network equipment 14 and transmit and receive those frames over a wired connection to the digital vehicular repeater 22, respectively.

The digital vehicular repeater 22 and the mobile subscriber unit 24 use the transmit antenna 40, receive antenna 42, transmitter 44, and receiver 46 to send and receive wireless communications. The transmit antenna 40, receive antenna 42, transmitter 44, and receiver 46 are conventional, and are not be described in detail.

In one exemplary embodiment, the electronic controller 48 is a microcontroller that includes at least a digital signal processor, a memory, and an input/output interface (including, for example, a data port). The digital signal processor executes computer-readable instructions ("software") stored in the memory to control the digital vehicular repeater system 12 as described herein.

Figure 3:
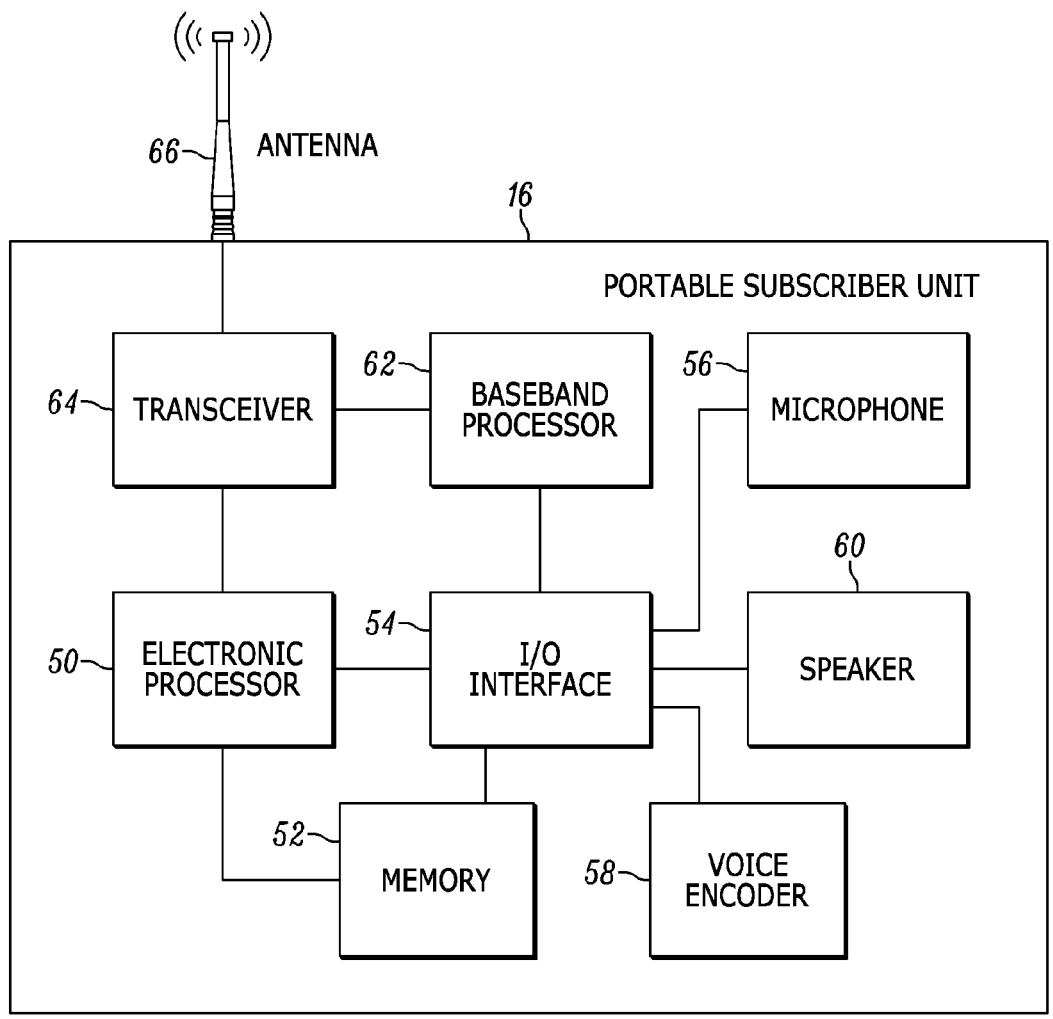
FIG. 3 is a block diagram of a portable subscriber unit in accordance with some embodiments.

FIG. 3 is a block diagram of one embodiment of the portable subscriber unit 16. In the illustrated embodiment, the portable subscriber unit 16 is a portable two-way radio, for example, one of the Motorola® ASTRO® 25 family of portable two-way radios. As noted above, in alternative embodiments, the portable subscriber unit 16 may be another type of electronic communications device capable of communicating wirelessly with the digital vehicular repeater system 12.

In the example illustrated, the portable subscriber unit 16 includes an electronic processor 50, a memory 52, an input/output interface 54, a microphone 56, a voice encoder 58, a speaker 60, a baseband processor 62, a transceiver 64, and an antenna 66. The foregoing components of the portable subscriber unit 16, along with other various modules and components, are coupled to each other by or through one or more control or data buses that enable communication therebetween. The use of control and data buses for the interconnection between and exchange of information among the various modules and components would be apparent to a person skilled in the art in view of the description provided herein. For ease of description, the portable subscriber unit 16 illustrated in FIG. 3 includes only one of each of the listed components. Alternative embodiments may include more or fewer of each of these components, may combine some components, or may include other alternative components.

In one exemplary embodiment, the electronic processor 50 is a digital signal processor. In alternative embodiments, the electronic processor 50 may include one or more processors, including a digital signal processor. The electronic processor 50 obtains and provides information (for example, from the memory 52 and/or the input/output interface 54), and processes the information by executing one or more software instructions or modules, capable of being stored, for example, in a random access memory ("RAM") area of the memory 52 (for example, during execution) or a read only memory ("ROM") of the memory 52 (for example, on a generally permanent basis) or another non-transitory computer readable medium. The software can include firmware, one or more applications, program data, filters, rules, one or more program modules, and other executable instructions. The electronic processor 50 is configured to retrieve from the memory 52 and execute, among other things, software related to the control processes and methods described herein.

The memory 52 can include one or more non-transitory computer-readable media, and includes a program storage area and a data storage area. The program storage area and the data storage area can include combinations of different types of memory, as described herein.

The input/output interface 54 is configured to receive input and to provide system output. The input/output interface 54 obtains information and signals from, and provides information and signals to, (for example, over one or more wired and/or wireless connections) devices both internal and external to the portable subscriber unit 16.

The microphone 56 is capable of sensing sound, converting the sound to electrical signals, and transmitting the electrical signals to the electronic processor 50 via the input/output interface 54. The electronic processor 50 processes the electrical signals received from the microphone 56. The electronic processor 50 is coupled to the voice encoder 58 via the input/output interface 54, and provides the processed and unprocessed electrical signals to the voice encoder 58 through the input/output interface 54.

The voice encoder ("vocoder") 58 encodes the electrical signals and produces a digital output for transmission by the portable subscriber unit 16 to other radio devices. The voice encoder 58 provides the digital output to the electronic processor 50 via the input/output interface 54. The voice encoder 58 encodes speech into a digital bit stream using, for example, improved multi-band excitation (IMBE™), advanced multi-band excitation (AMBE™), or another suitable algorithm. The voice encoder 58 is capable of encoding a digital bit stream at 7200 bits per second (that is, full-rate encoded audio) and at 3600 bits per second (that is, half-rate encoded audio). In some embodiments, the voice encoder 58 operates according to the Telecommunications Industry Association TIA-102.BABA-A standard.

The speaker 60 is a transducer for reproducing sound from electrical signals received from the electronic processor 50 via the input/output interface 54. The speaker is conventional, and will not be described in detail.

The baseband processor 62 is configured to encode and decode digital data sent and received by the transceiver 64. The transceiver 64 transmits and receives radio signals to and from various wireless communications networks using the antenna 66. The electronic processor 50, the voice encoder 58, the baseband processor 62, and the transceiver 64 may include various digital and analog components, which for brevity are not described herein and which may be implemented in hardware, software, or a combination of both. Some embodiments include separate transmitting and receiving components, for example, a transmitter and a receiver, instead of a combined transceiver 64.

As described in detail below, the electronic processor 50 is configured to control the voice encoder 58 to encode speech at either full-rate or half-rate, depending on how the speech is be transmitted by the portable subscriber unit 16.

Two-way radios that communicate voice messages (that is, a digital bit stream produced by a voice encoder) according to the existing common air interface transmit full-rate audio in logical data units and frequency division multiple access frames. The digital bit stream is broken into voice frames that are eighty-eight bits in length (each representing twenty milliseconds of speech). The voice frame is protected using error correction codes, which add an additional fifty-six bits, resulting in a full-rate voice code word of one hundred forty-four bits in length.

A two-way radio communicating with the "Project 25" Phase 2 time division multiple access protocol (for example, the network subscriber unit 20), however, transmits half-rate encoded audio. Half-rate encoded audio communicates twenty milliseconds of speech in seventy-two bits. A two-way radio configured to transceive full-rate audio (for example, the legacy subscriber unit 18) is not able to transceive half-rate audio, and vice versa. Accordingly, as illustrated in FIG. 4, embodiments of the portable subscriber unit 16 and the digital vehicular repeater system 12 are configured to embed half-rate encoded audio in a frequency division multiple access logical data unit.

In one exemplary embodiment, the electronic processor 50 of the portable subscriber unit 16 is configured to receive a half-rate encoded voice frame 70 from the voice encoder 58 and produce a half-rate embedded logical data unit 71 that includes a half-rate embedded voice code word 74 and a scrambled network identifier 76. In another exemplary embodiment, the electronic controller 48 of the digital vehicular repeater system 12 is configured to receive the half-rate encoded voice frame 70 as part of a time division multiple access frame received from the fixed network equipment 14, and produce a half-rate embedded logical data unit 71. In the exemplary embodiments, the half-rate embedded logical data unit 71 is configured as a common air interface logical data unit, which can be transmitted using a frequency division multiple access frame (for example, a superframe). Accordingly, in the exemplary embodiments, the half-rate embedded logical data unit 71 also includes eight additional half-rate encoded voice frames, a frame sync signal, and other components specified by the common air interface standard.

Figure 4:
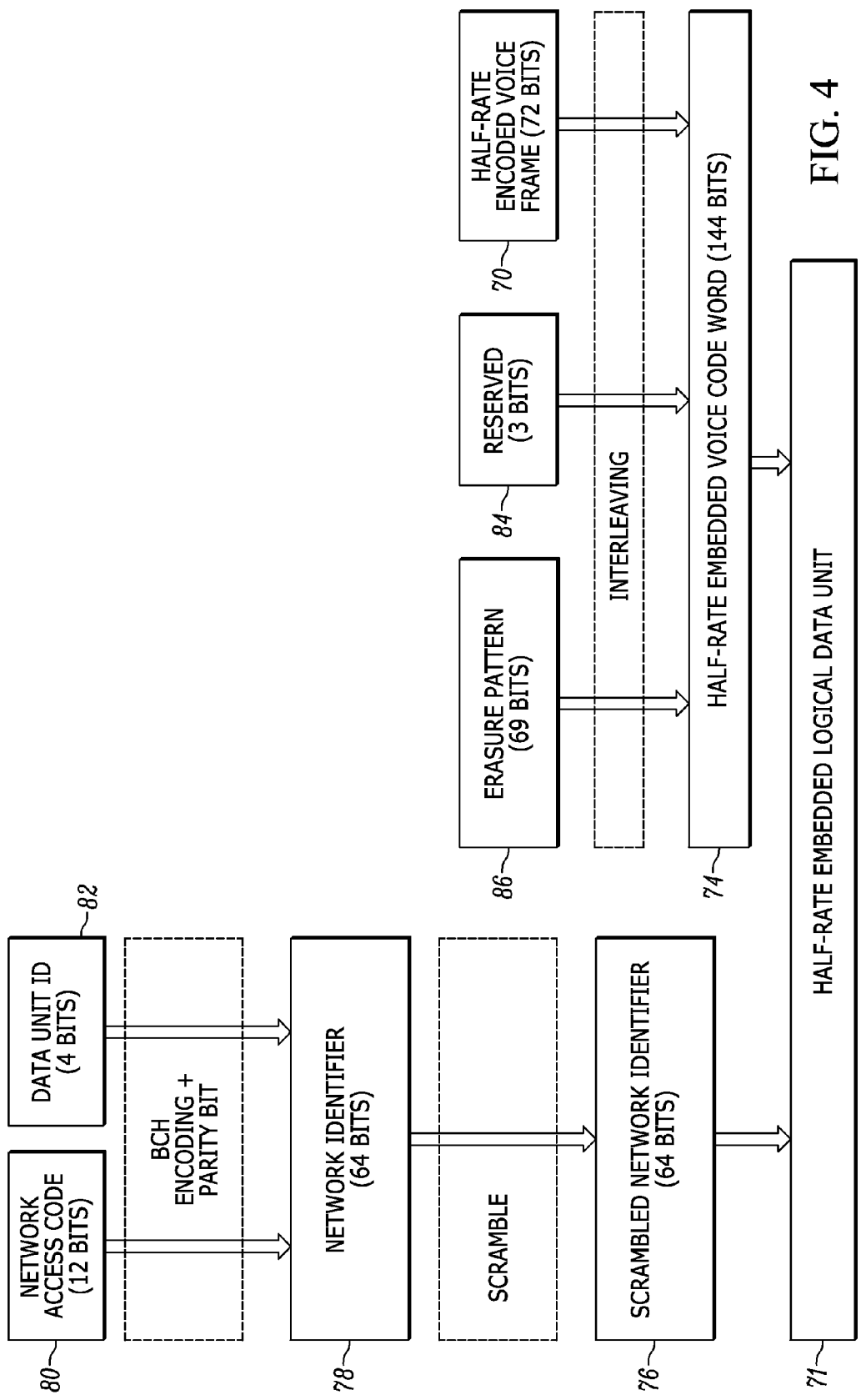
FIG. 4 is a block diagram illustrating the composition of a half-rate embedded logical data unit in accordance with some embodiments.

As illustrated in FIG. 4, the half-rate embedded voice code word 74 is, like a full-rate voice code word, one hundred forty-four bits in length. Therefore, it is communicated within the half-rate embedded logical data unit 71 as if it were a full-rate voice code word. The half-rate embedded logical data unit 71 is received by the digital vehicular repeater system 12, the portable subscriber unit 16, and the legacy subscriber unit 18 as if it were an ordinary common air interface logical data unit. However, as described in detail herein, while the legacy subscriber unit 18 processes the half-rate embedded logical data unit 71 as if it were an standard common air interface logical data unit, the digital vehicular repeater system 12 and the portable subscriber unit 16 process the half-rate embedded logical data unit 71 differently to extract the half-rate encoded voice frame 70.

As described in detail below, the scrambled network identifier 76 includes a network identifier 78. The network identifier 78 includes a network access code 80 and a data unit identifier 82, both of which are known and are not be described in detail. The half-rate embedded voice code word 74 includes the half-rate encoded voice frame 70, a reserved code 84, and an erasure pattern 86. As noted above, the half-rate encoded voice frame 70 is seventy-two bits in length. The reserved code 84 is three bits in length. The erasure pattern 86, the composition of which is described in detail below, is sixty-nine bits in length. As described in detail below, these three components are interleaved to form the half-rate embedded voice code word 74, which, like a full-rate voice code word, is one hundred forty-four bits in length.

Figure 5:
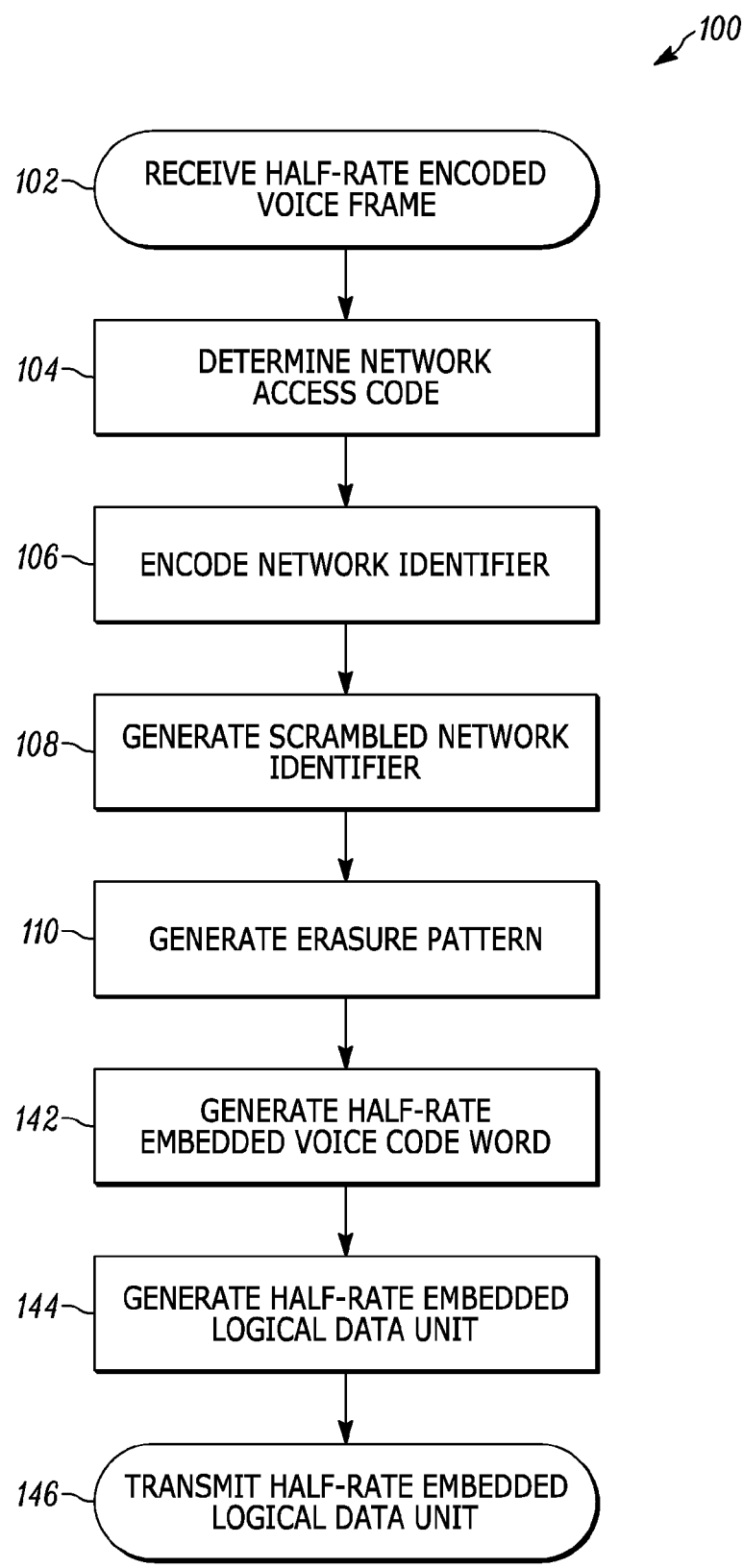
FIG. 5 is a flowchart of a method of operating the communications system of FIG. 1 in accordance with some embodiments.

FIG. 5 illustrates an exemplary method 100 for operating the communications system 10. For ease of description, embodiments of the method 100 are described in relation to at least a digital signal processor. Embodiments of the method 100 may be implemented using the digital vehicular repeater system 12 and the portable subscriber unit 16, both of which include, among other things, a digital signal processor. Portions of the method 100 may be performed using other processors or components of the digital vehicular repeater system 12 and the portable subscriber unit 16. Differences between the digital vehicular repeater system 12 and the portable subscriber unit 16 regarding implementations of the method 100 are noted where appropriate.

Figure 6A:
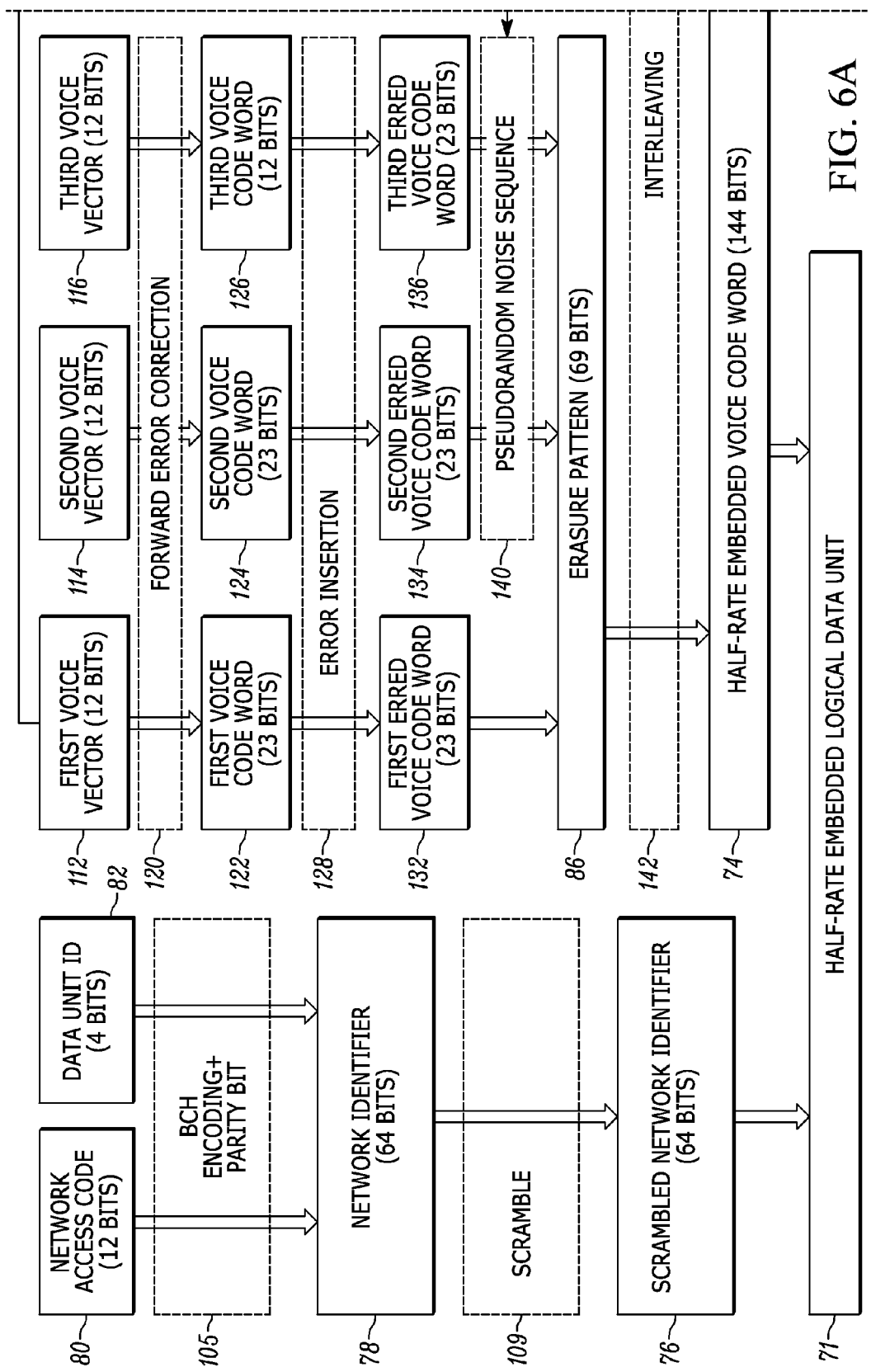
FIGS. 6A and 6B are a block diagram illustrating the composition of an erasure pattern and a half-rate embedded logical data unit in accordance with some embodiments.
Figure 6B:
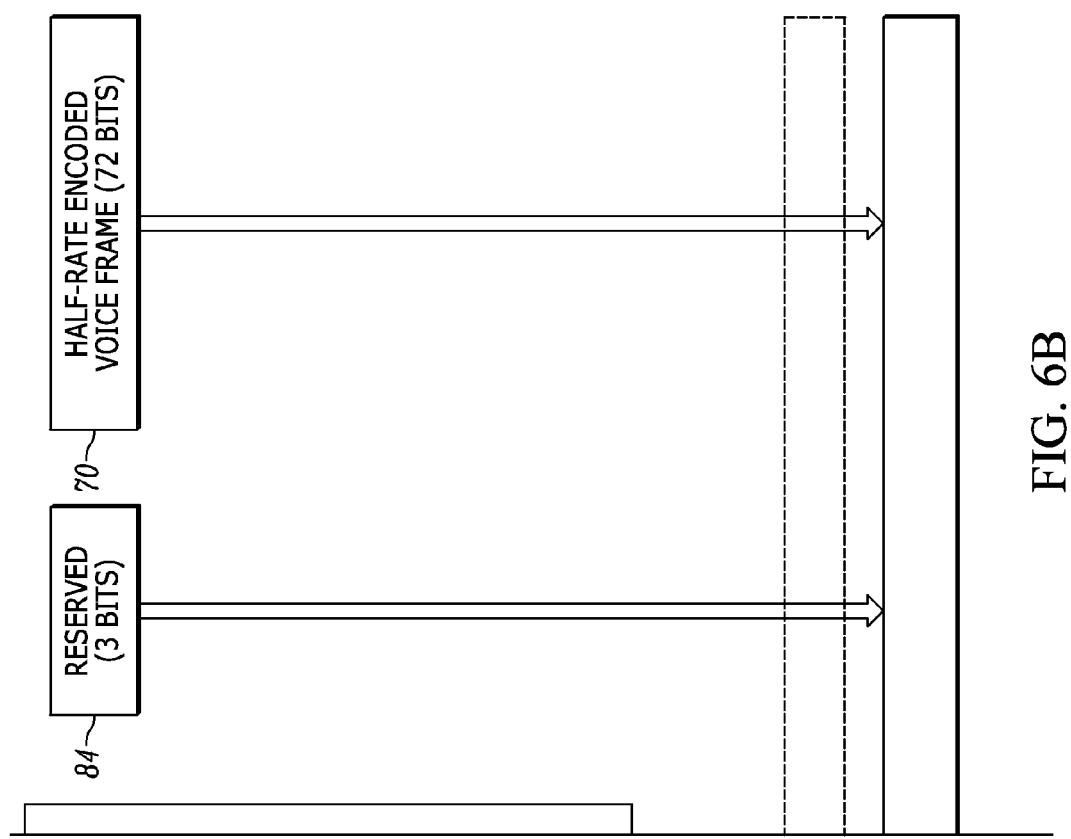

At block 102, the digital signal processor receives a half-rate encoded voice frame 70 from either the voice encoder 58 (in the case of the portable subscriber unit 16 or the mobile subscriber unit 24 (in the case of the digital vehicular repeater system 12). At block 104, the digital signal processor determines the network access code 80 (as illustrated in FIGS. 6A AND 6B). In some embodiments, the digital signal processor determines the network access code 80 from a time division multiple access frame. Methods for determining the network access code 80 are known, and are not be described in detail. At block 104, the digital signal processor encodes the network identifier 78 from the network access code 80 and the data unit identifier 82. The network identifier 78 is encoded using a BCH (Bose Chaudhuri Hocquenghem) error correcting code and a parity bit (at block 105 in FIGS. 6A AND 6B). The network identifier 78 is encoded according to the existing common air interface standard.

As noted above, the half-rate embedded logical data unit 71 is formatted as if it were a standard common air interface logical data unit. The half-rate embedded logical data unit 71 would therefore appear to the legacy subscriber unit 18 as if it were a standard common air interface logical data unit containing a full-rate voice code word. As can be appreciated by one skilled in the art, a full-rate voice code word, produced according to the existing common air interface, contains a full-rate audio bit stream, which has been split into vectors, encoded into code words, and interleaved. When the legacy subscriber unit 18 receives a full-rate voice code word, it reverses the process, de-interleaving, decoding, and recombining the data into the original bit stream (referred to herein only as "decode" or "decoding" for ease of description). The legacy subscriber unit 18 converts the bit stream to an analog signal and plays the resulting audio on a speaker.

However, because the data in the half-rate embedded logical data unit 71 is not full-rate encoded audio, decoding it on the legacy subscriber unit 18 would result in garbled audio (for example, partially discernable speech, static, and the like), which could cause confusion or annoyance to users of the legacy subscriber unit 18. Accordingly, at block 108, the digital signal processor generates the scrambled network identifier 76. The scrambled network identifier 76 prevents the legacy subscriber unit 18 from processing the half-rate embedded logical data unit 71. In the example illustrated, the scrambled network identifier 76 is produced by modulating a sixty-four bit bitmask and the network identifier 78 using an exclusive- or logical operation (at block 109 in FIGS. 6A AND 6B). The sixty-four bit bitmask is configured such that there is a high probability (for example, 99.96%) that decoding the scrambled network identifier 76 using the BCH code fails (that is, it does not produce a valid network access code). According to the existing common air interface, when the legacy subscriber unit 18 is unable to determine a valid network access code for a logical data unit, it ignores and discards the logical data unit. Because there remains some chance that scrambling the network identifier 78 does not result in discarding the half-rate embedded logical data unit 71, the erasure pattern 86 is also included in the half-rate embedded voice code word 74.

At block 110, the digital signal processor generates the erasure pattern 86. In the example illustrated in FIGS. 6A AND 6B, generating the erasure pattern 86 begins with a first voice information vector 112, a second voice information vector 114, and a third voice information vector 116, (a plurality of voice information vectors) corresponding to the common air interface standard vectors u_0, u_1, and u_2, respectively. At block 120 (in FIGS. 6A AND 6B), error correction is carried out, by for example, applying a Golay code forward error correction (FEC) algorithm to the first voice information vector 112, the second voice information vector 114, and the third voice information vector 116, according to the common air interface standard, to produce a first voice code word 122, a second voice code word 124, and a third voice code word 126 (a plurality of voice code words).

At block 128 (in FIGS. 6A AND 6B), the digital signal processor introduces a plurality of errors into the first voice code word 122, the second voice code word 124, and the third voice code word 126 to produce a first erred voice code word 132, a second erred voice code word 134, and a third erred voice code word 136 (a plurality of erred voice code words). According to the common air interface standard, the legacy subscriber unit 18 squelches its audio output when the bit error rate of decoded audio exceeds a bit error rate threshold (for example, a bit error rate greater than 0.875). Errors are introduced after forward error correction is applied to ensure that the bit error rate threshold is exceeded when the legacy subscriber unit 18 decodes the half-rate embedded voice code word 74. The legacy subscriber unit 18 therefore remains muted even when decoding the scrambled network identifier 76 produces a valid network access code.

At block 140 (in FIGS. 6A AND 6B), the first voice information vector 112 is used as a seed to generate a pseudorandom noise sequence, which is modulated with the second erred voice code word 134 and the third erred voice code word 136 using an exclusive- or logical operation. The modulated second erred voice code word 134 and third erred voice code word 136 are combined with the first erred voice code word 132 to produce the erasure pattern 86.

Though the first erred voice code word 132, the second erred voice code word 134, and the third erred voice code word 136 all contain deliberately-introduced errors, the number of errors in each code word may differ. In one exemplary embodiment, the first erred voice code word 132 contains two errors, while the second erred voice code word 134 and the third erred voice code word 136 each contain three errors. The maximum error correcting capability of the Golay code is three errors. The first erred voice code word 132 contains two errors, rather than three, to ensure that it can be successfully decoded and used to reproduce the pseudorandom noise sequence. The pseudorandom noise sequence may then be used to successfully demodulate the second erred voice code word 134 and the third erred voice code word 136 with their respective errors intact. This helps ensure that those errors are present to contribute to exceeding the bit error rate threshold when the legacy subscriber unit 18 decodes the half-rate embedded voice code word 74. The first erred voice code word 132 also contains two errors because, although it can still be successfully decoded, the two detected errors lower the bit error rate threshold, according to the common air interface standard. A lower bit error rate threshold further ensures that the legacy subscriber unit 18 therefore remains muted even when decoding the scrambled network identifier 76.

Returning now to FIG. 5, at block 142, the digital signal processor interleaves the half-rate encoded voice frame 70, the reserved code 84, and the erasure pattern 86 to generate the half-rate embedded voice code word 74. At block 144, the digital signal processor combines the half-rate embedded voice code word 74 and the scrambled network identifier 76 to generate the half-rate embedded logical data unit 71. For ease of description, the method 100 is described in terms of generating only one half-rate embedded voice code word 74. As can be appreciated by one skilled in the art, the method 100 may be used to generate and package nine half-rate embedded voice code words in a single half-rate embedded logical data unit 71.

Finally, at block 146, the half-rate embedded logical data unit 71 is transmitted, by the portable subscriber unit 16 or the digital vehicular repeater system 12, using the common air interface standard protocol.

Figure 7:
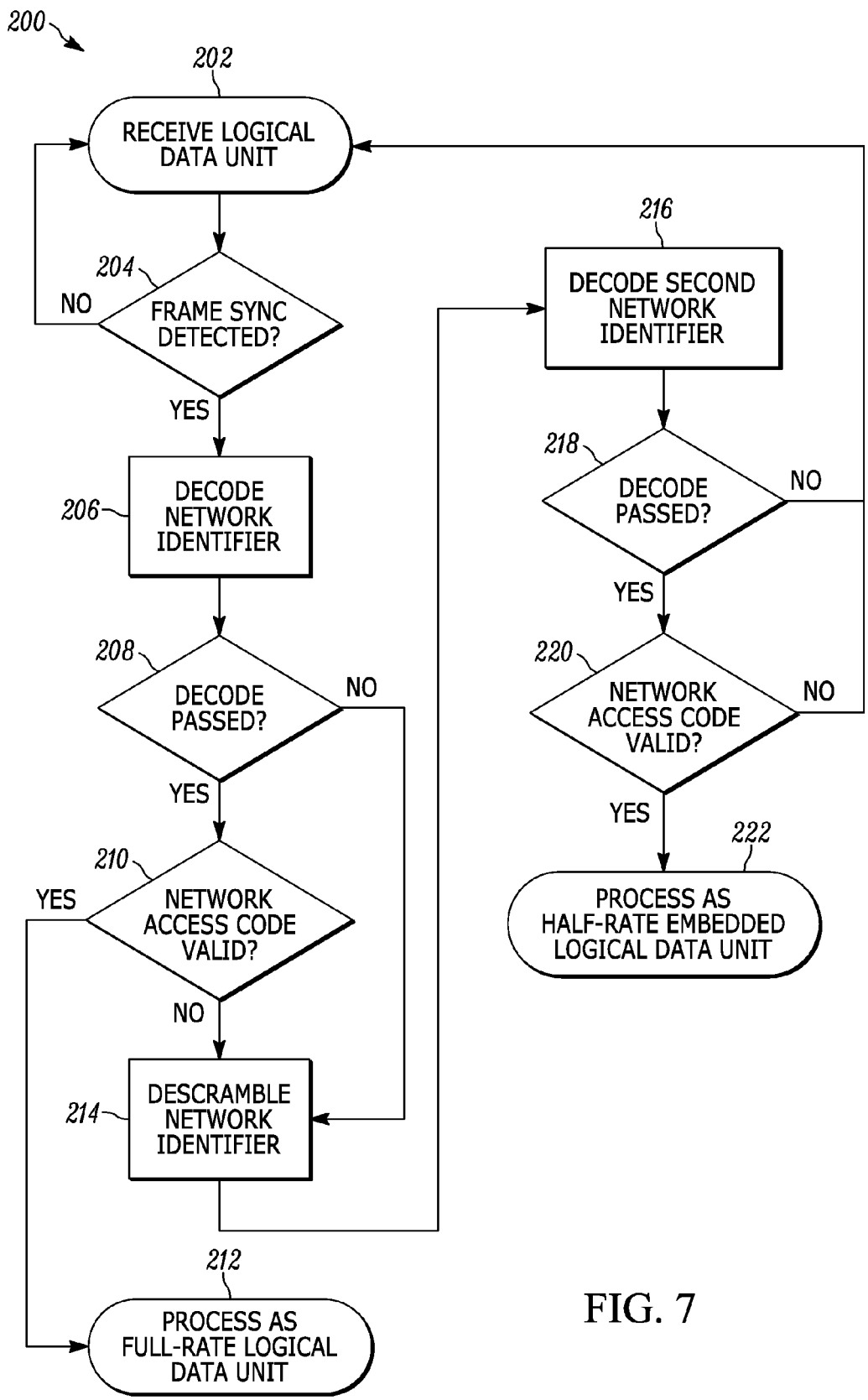
FIG. 7 is a flowchart of a method of operating the communications system of FIG. 1 in accordance with some embodiments.

FIG. 7 illustrates an exemplary embodiment of a method 200 for operating the communications system 10. In particular, embodiments of method 200 relate to processing the half-rate embedded logical data unit 71 when it is received. For ease of description, embodiments of the method 200 are described in relation to at least a digital signal processor. Embodiments of the method 200 may be implemented using the digital vehicular repeater system 12 and the portable subscriber unit 16, both of which include, among other things, a digital signal processor. Portions of the method 200 may be performed using other processors or components of the digital vehicular repeater system 12 and the portable subscriber unit 16. Differences between the digital vehicular repeater system 12 and the portable subscriber unit 16 regarding implementations of the method 200 are noted where appropriate.

At block 202, the digital signal processor receives a common air interface logical data unit. The logical data unit may be a half-rate embedded logical data unit produced according to the method 100, or it may be a full-rate encoded voice logical data unit according to the common air interface standard.

At block 204, the digital signal processor attempts to detect frame synchronization or "frame sync". Frame synchronization is known, and will not be described in detail. When frame sync is not detected, the digital signal processor begins the method again at block 202. When frame sync is detected, the digital signal processor decodes the frame's network identifier using the BCH code to produce a decoded network access code. At block 208, the digital signal processor determines whether the decode passed (that is, the decode error checking is below the threshold). When the decode is passed, the digital signal processor determines whether the decoded network access code is valid, at block 210. In one exemplary embodiment, the decoded network access code is valid when it is active on the land mobile radio network with which the digital vehicular repeater system 12 and the portable subscriber unit 16 are affiliated. When the decoded network access code is valid, it can be inferred that the logical data unit received at block 202 is a common air interface full-rate logical data unit. The digital signal processor processes the full-rate encoded logical data unit according to the common air interface standard, at block 212.

When the decoded network access code is not valid at block 210, or when the decode of the logical data unit's network identifier does not pass at block 208, it can be inferred that the network identifier is the scrambled network identifier 76 (as illustrated in FIG. 5). Accordingly, at block 214, the digital processor descrambles the scrambled network identifier 76 to produce a second network identifier. At block 216, the digital signal processor decodes the second network identifier to generate a second network access code. Similar to block 208, the digital signal processor determines whether the decode has passed at block 218. When the decode fails, the digital signal processor discards the logical data unit and begins again at block 202. When the decode passes, the digital signal processor determines whether the second network access code is valid, at block 220. When the second network access code is not valid, the digital signal processor discards the logical data unit and begins again at block 202.

When the second network access code is valid, it can be inferred that the logical data unit received at block 202 is the half-rate embedded logical data unit 71. At block 222, the digital signal processor processes the half-rate embedded logical data unit 71. The digital signal processor uses the method 100 in reverse to extract the half-rate embedded voice code word 74 from the half-rate embedded logical data unit 71, and to extract the half-rate encoded voice frame 70 from the half-rate embedded voice code word 74. In one example embodiment, where the method 200 is implemented on the portable subscriber unit 16, the electronic processor 50 converts the half-rate encoded voice frame 70 to audio signals and plays the audio signals on the speaker 60. In a second example embodiment, where the method 200 is implemented on the digital vehicular repeater system 12, the electronic controller 48 generates a time division multiple access frame using the half-rate encoded voice frame 70 and the second network identifier, and transmits the time division multiple access frame to the fixed network equipment 14 via the mobile subscriber unit 24. For ease of description, the method 200 is described in terms of detecting and decoding only one half-rate embedded voice code word 74. As can be appreciated by one skilled in the art, the method 200 may be used to detected and decode nine half-rate embedded voice code words from a single half-rate embedded logical data unit 71.

It should be noted that the systems and methods described herein are not limited to embedding half-rate encoded audio frames. The methods described herein may be used to embed audio encoded at any rate less than the full rate, such as, for example, quarter-rate encoded audio.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for communicating half-rate encoded voice frames, the method comprising:
   receiving, by a digital signal processor, a half-rate encoded voice frame;
   determining, by the digital signal processor, a network access code;
   encoding, by the digital signal processor, a network identifier based on the network access code;
   scrambling, by the digital signal processor, the network identifier to generate a scrambled network identifier;
   generating, by the digital signal processor, an erasure pattern including a deliberately-introduced error;
   generating, by the digital signal processor, a half-rate embedded voice code word based on the erasure pattern and the half-rate encoded voice frame; and
   generating, by the digital signal processor, a half-rate embedded logical data unit based on the half-rate embedded voice code word and the scrambled network identifier.

2. The method of claim 1, further comprising:
   transmitting, by the digital signal processor via a transceiver, the half-rate embedded logical data unit.

3. The method of claim 1, wherein receiving the half-rate encoded voice frame includes receiving a time division multiple access frame from a mobile subscriber unit.

4. The method of claim 1, wherein receiving half-rate encoded voice frame includes receiving the half-rate encoded voice frame from a voice encoder.

5. The method of claim 1, wherein scrambling the network identifier includes applying a bit mask to the network identifier using an exclusive or operation.

6. The method of claim 1, wherein generating the half-rate embedded logical data unit includes generating, by the digital signal processor, a common air interface logical data unit.

7. The method of claim 1, wherein generating an erasure pattern includes applying, by the digital signal processor, forward error correction to a plurality of voice information vectors to generate a plurality of voice code words;

inserting, by the digital signal processor, a plurality of errors into the plurality of voice code words to generate a plurality of erred voice code words; and applying, by the digital signal processor, a pseudorandom noise sequence to at least one of the plurality of erred voice code words.

8. The method of claim 1, further comprising:

receiving, by the digital signal processor, a second half-rate embedded logical data unit including a second scrambled network identifier and a second half-rate embedded voice code word;

decoding, by the digital signal processor, the second scrambled network identifier to generate a decoded network access code;

determining, by the digital signal processor, whether the decoded network access code is invalid;

descrambling, by the digital signal processor, the second scrambled network identifier to extract a second network identifier when the decoded network access code is invalid;

decoding, by the digital signal processor, the second network identifier to extract a second network access code;

determining, by the digital signal processor, whether the second network access code is valid;

extracting, by the digital signal processor, the second half-rate embedded voice code word from the second half-rate embedded voice message when the second network access code is valid; and extracting, by the digital signal processor, a second half-rate encoded voice frame from the second half-rate embedded voice code word.

9. The method of claim 8, further comprising:

generating, by the digital signal processor, a second time division multiple access frame based on the second network identifier and the second half-rate encoded voice frame; and transmitting, by the digital signal processor via a data link, the second time division multiple access frame.

10. The method of claim 8, further comprising:

generating, by the digital signal processor, an audio output from the second half-rate encoded voice frame; and playing, via a speaker, the audio output.

11. An electronic communications device, the device comprising:

a transceiver, and a digital signal processor electrically coupled to the transceiver and configured to receive a half-rate encoded voice frame;

determine a network access code;

encode a network identifier based on the network access code;

scramble the network identifier to generate a scrambled network identifier;

generate an erasure pattern including a deliberately-introduced error;

generate a half-rate embedded voice code word based on the erasure pattern and the half-rate encoded voice frame;

generate a half-rate embedded logical data unit based on the half-rate embedded voice code word and the scrambled network identifier; and transmit, via the transceiver, the half-rate embedded logical data unit.

12. The device of claim 11, further comprising:

a data port;

wherein receiving the half-rate encoded voice frame includes receiving a time division multiple access frame from a mobile subscriber unit via the data port.

13. The device of claim 11, further comprising:

a voice encoder, wherein the digital signal processor is further configured to receive the half-rate encoded voice frame from the voice encoder.

14. The device of claim 11, wherein the digital signal processor is further configured to receive a second half-rate embedded logical data unit including a second scrambled network identifier and a second half-rate embedded voice code word;

decode the second scrambled network identifier to generate a decoded network access code;

determine whether the decoded network access code is invalid;

descramble the second scrambled network identifier to extract a second network identifier when the decoded network access code is invalid;

decode the second network identifier to extract a second network access code;

determine whether the second network access code is valid;

extract a second half-rate embedded voice code word from the second half-rate embedded logical data unit when the second network access code is valid; and extract a second half-rate encoded voice frame from the second half-rate embedded voice code word.

15. The device of claim 14, further comprising:

a data port, wherein the digital signal processor is further configured to generate a second time division multiple access frame based on the second network identifier and the second half-rate encoded voice frame; and transmit, via the data port, the second time division multiple access frame.

16. The device of claim 14, further comprising:

a speaker, wherein the digital signal processor is further configured to generate an audio output from the second half-rate encoded voice frame; and play, via the speaker, the audio output.

* * * * *